J. T. WISNER.
CONCRETE MOLDING MACHINE.
APPLICATION FILED JUNE 4, 1918.
1,323,345.
Patented Dec. 2, 1919.
2 SHEETS—SHEET 1.
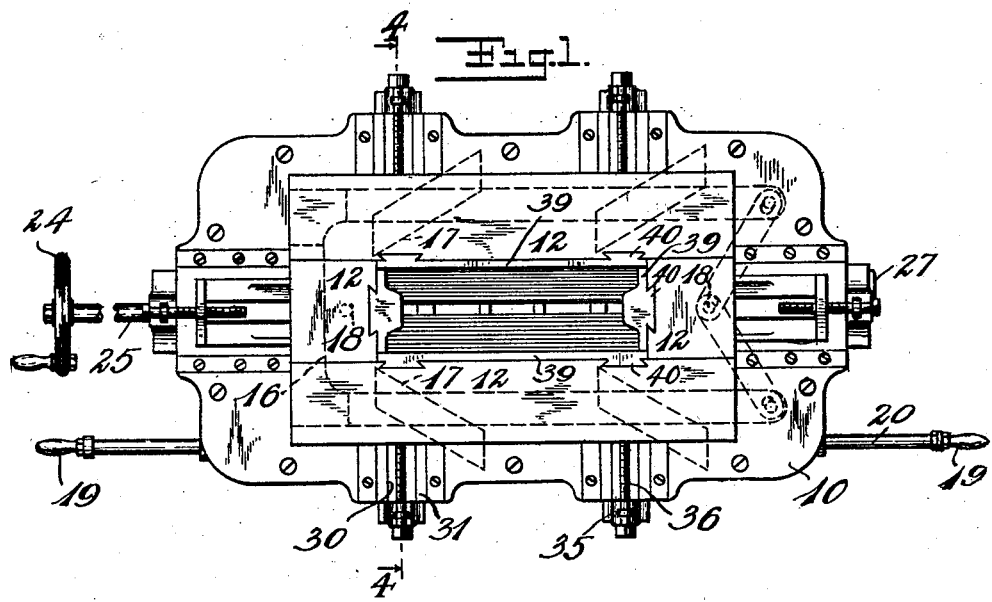
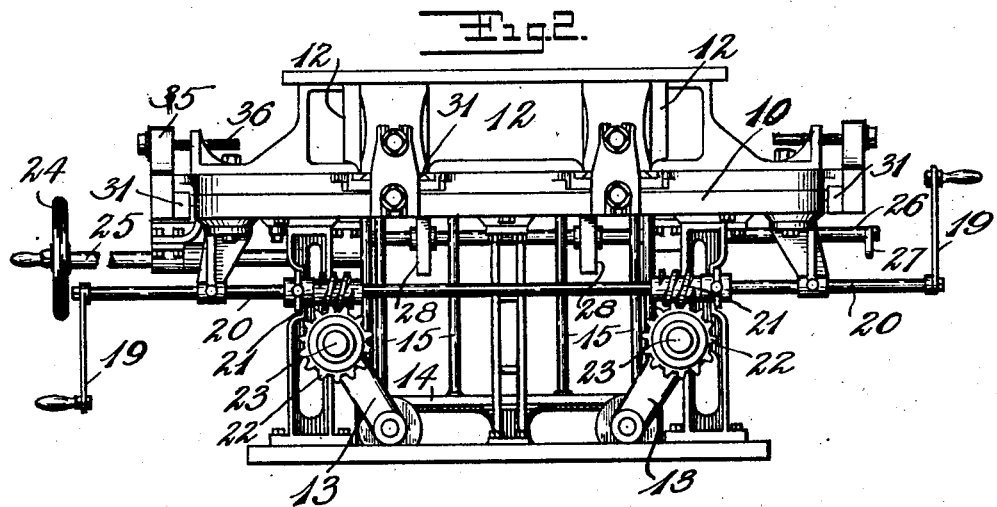

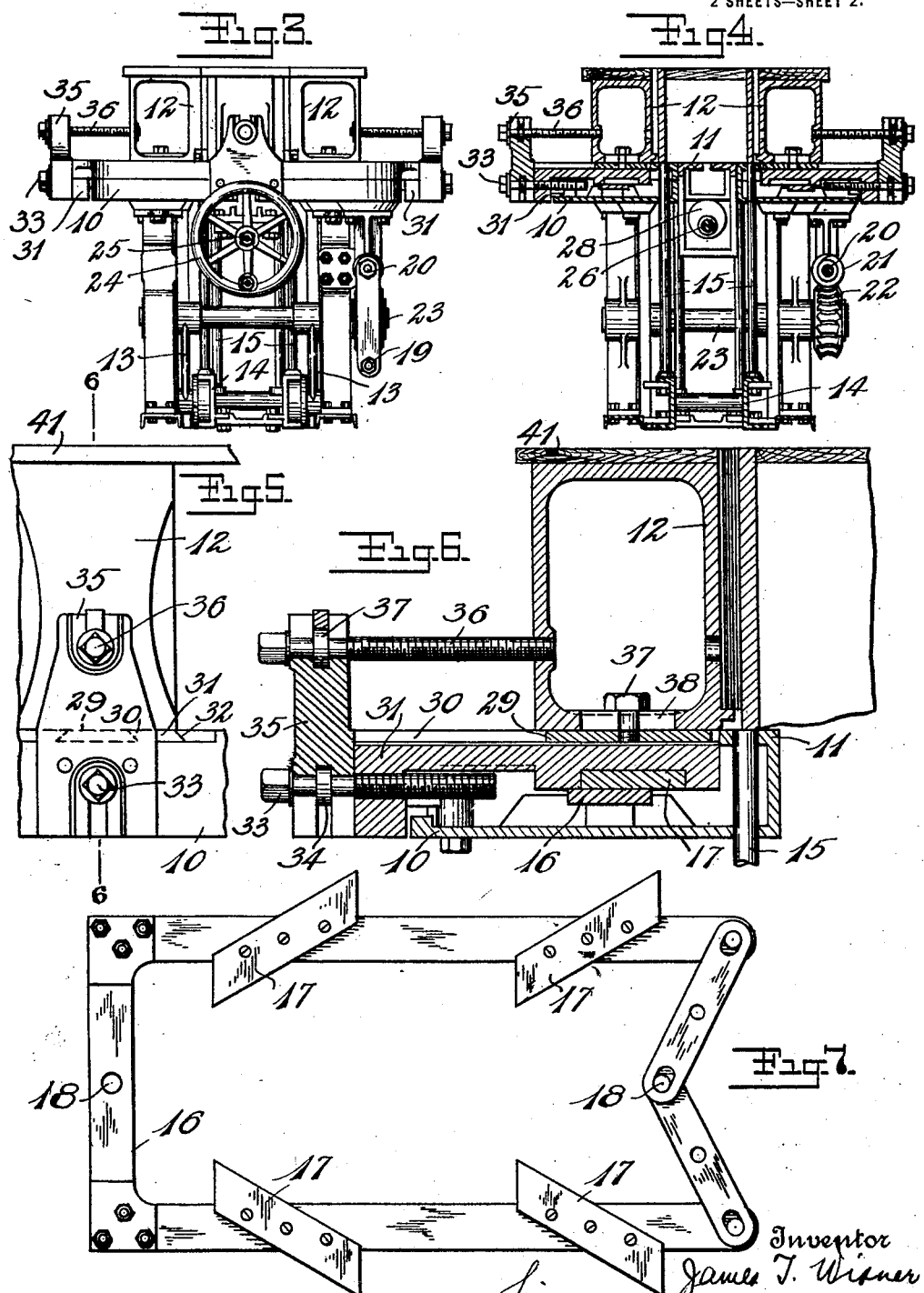

UNITED STATES PATENT OFFICE.

JAMES T. WISNER, OF NEW YORK, N. Y.

CONCRETE-MOLDING MACHINE.

1,323,345.  Specification of Letters Patent.  Patented Dec. 2, 1919.

Application filed June 4, 1918. Serial No. 238,083.

*To all whom it may concern:*

Be it known that I, JAMES T. WISNER, a citizen of the United States, residing at New York, in the county of New York and State of New York, have invented certain new and useful Improvements in Concrete-Molding Machines, of which the following is a specification.

This invention relates to machines for molding "concrete blocks" and the objects of the invention are to provide a machine which can readily be adjusted for molding blocks of various sizes and which while having a relatively great range of adjustment, will be compact in size and of simple construction.

Additional objects are to provide a close-fitting mold and one which can be quickly opened to expose the molded product.

The invention accordingly resides in part, in the provision of means for adjusting the mold sides throughout one stage and additional means for adjusting the mold sides throughout a second or greater stage. Also in the arrangement of the mold sides overstanding the mold bottom and the provision of means for retracting the mold sides in advance of the rising or ejecting movement of the mold bottom.

Other features will appear from the detailed description which follows and from the accompanying drawings which present the invention in one of its practical commercial forms.

In said drawings, Figure 1 is a top plan view of the machine; Fig. 2 is a side view thereof; Fig. 3 is a left hand end view of the machine; Fig. 4 is a cross-sectional view substantially on the plane of line 4—4 of Fig. 1; Figs. 5 and 6 are enlarged end and longitudinal sectional views respectively of the mold adjusting devices, Fig. 6 being taken on the plane of line 6—6 of Fig. 5; Fig. 7 is a detached plan view of the mold-side opening means.

The bed or base of the machine is designated 10, the bottom of the mold is designated 11 and the mold sides are designated 12.

The mold bottom is elevated for the purpose of ejecting the molded product and the mold sides are opened or spread to free them of the block, by means similar to those disclosed in Patent No. 765,350 and consisting, first, of the swinging arms 13, engaging with a frame 14, carrying the bottom supporting posts 15, and second, the generally U-shaped sliding frame 16, carrying the cams 17, for spreading the members 12 which form the sides of the mold chamber and connected at 18 (Fig. 7) with the members 12, which form the ends of the mold chamber. The swinging arms 13 are operated by means of handles 19, on longitudinally extending shaft 20, which carries worm 21, meshing with worm gears 22, on the rock shaft 23, which carry the arms 13. The mold-side spreading frame 16 is operated from a hand wheel 24 on shaft 25 which is connected with said frame through the medium of a worm or screw connection, as in the patent mentioned. Similarly, there is provided in the present machine also a longitudinally extending shaft 26, operated by a handle 27 and carrying cams or eccentrics 28 for lowering or collapsing the cores which may be employed in the molding of the block.

The mold sides are adjustably mounted on slides 29, working in undercut guides 30 in the tops of slides 31, which in turn are slidably mounted in guides 32 in the base or bed 10. These lower or base slides at the side of the machine, are engaged and directly operated by the spreading cams 17, and the end slides are directly connected at 18 (Figs. 1 and 6) with the spreading frame 16.

The upper mold-side supporting slides 29 are adjusted primarily by the adjusting screws 33, engaged in screw seats in the main slides 31 and having thrust collars 34 engaged in seats in an adjusting head 35, and secondarily, by screws 36, making screw-threaded engagement directly with the mold sides and having thrust collars 37, bearing in said movably supported adjusting heads or blocks 35.

In operation, the mold sides may be roughly adjusted to the required length and width of block by means of screws 33 and the final adjustment may be made by means of the secondary or final adjusting screws 36. Or, if a considerable adjustment is necessary, the mold sides may be adjusted substantially up to the limit of the first set of adjusting screws and the adjustment then be further continued to the extent necessary by means of the second set of screws. This construction thus provides in compact form, means for adjusting the mold sides throughout a relatively wide range.

Adjustment of the mold sides on their supporting slides is provided for by securing them in place thereon by bolts 37, extending through slots 38 in the base portions of said mold sides into the slides. This construction enables the slides being adjusted inward or outward (Fig. 6) to preserve the proper relation with the mold bottom 11.

The mold sides may have facing plates 39, of suitable design or conformation applied thereto, the same being shown connected therewith by the dovetail slides 40. This enables the ready interchange of different face plates, the face plates being applied or removed by simply lifting them up or dropping them down into place, as the case may be.

A relatively close-fitting mold chamber is provided by causing the mold sides, when the mold is closed, to overstand the edges of the mold bottom, as indicated in Fig. 6. In opening the mold, the handwheel 24 is first operated to retract the mold sides and carry them back from over the mold bottom, after which the bottom can be elevated, free of such mold sides.

In addition to the foregoing advantageous features, the mold sides or walls, are shown as provided with the table sections 41, which may be utilized as temporary supports in removing the molded product.

I claim:

1. In a concrete block machine, a supporting bed, mold walls slidably supported thereon, means for adjusting said mold walls a limited distance and independent means for further adjusting the mold walls.

2. In a concrete block machine, a supporting bed, mold walls slidably supported thereon, a set of screws for adjusting said mold walls throughout a limited range and a second set of screws for adjusting the mold walls throughout an extended range.

3. In a concrete block machine, a supporting bed, slides supported on said bed, means for adjusting said slides, mold walls adjustably carried by said slides and means for adjusting the mold walls with respect to said slides.

4. In a concrete block machine, a supporting bed, slides supported on said bed, screws for adjusting said slides, mold walls adjustably carried by said slides and screws for adjusting the mold walls with respect to said slides.

5. In a concrete block machine, the combination of primary slides and means for adjusting the same, secondary slides adjustably mounted on the primary slides and means for adjusting said secondary slides thereon and mold walls mounted on said secondary slides.

6. In a machine of the character set forth in claim 5, means for enabling relative adjustment of said mold walls and the secondary slides supporting the same.

7. In a machine of the character set forth, a supporting bed, primary slides movably mounted thereon, means for retracting said slides to open the mold, secondary slides mounted on said primary slides, mold walls mounted on said secondary slides and means for adjusting said secondary mold-wall supporting slides.

8. A machine of the character set forth in claim 7 wherein the latter adjusting means comprises primary and secondary adjusting screws for effecting a double adjustment of the secondary slides.

9. In a concrete block machine, adjustable slides, secondary slides adjustable thereon, mold walls mounted on said secondary slides, adjusting heads, screws for adjusting said heads with respect to the first slides and adjusting screws between said adjusting heads and the mold walls.

In testimony whereof I affix my signature.

JAMES T. WISNER.